United States Patent
Lais et al.

(10) Patent No.: US 10,948,322 B2
(45) Date of Patent: Mar. 16, 2021

(54) SENSOR ASSEMBLY FOR A SENSOR, SENSOR, AND MEASUREMENT SYSTEM FORMED THEREWITH

(71) Applicant: Endress + Hauser Flowtec AG, Reinach (CH)

(72) Inventors: Christian Lais, Munchenstein (CH); Andreas Strub, Weil am Rhein (DE); Dominique Wiederkehr, Hagenthal-le-bas (FR)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 285 days.

(21) Appl. No.: 16/082,584

(22) PCT Filed: Feb. 13, 2017

(86) PCT No.: PCT/EP2017/053101
§ 371 (c)(1),
(2) Date: Sep. 6, 2018

(87) PCT Pub. No.: WO2017/153124
PCT Pub. Date: Sep. 14, 2017

(65) Prior Publication Data
US 2019/0094054 A1 Mar. 28, 2019

(30) Foreign Application Priority Data
Mar. 10, 2016 (DE) ...................... 10 2016 104 423.7

(51) Int. Cl.
*G01F 1/32* (2006.01)
*G01F 1/86* (2006.01)

(52) U.S. Cl.
CPC .......... *G01F 1/3263* (2013.01); *G01F 1/3209* (2013.01); *G01F 1/3218* (2013.01); *G01F 1/3272* (2013.01); *G01F 1/86* (2013.01)

(58) Field of Classification Search
CPC .... G01F 1/3263; G01F 1/3209; G01F 1/3218; G01F 1/3272; G01F 1/86
See application file for complete search history.

(56) References Cited

U.S. PATENT DOCUMENTS 6,003,384 A * 12/1999 Frohlich ............... G01F 1/3263
73/861.22
6,101,885 A 8/2000 Touzin et al.
(Continued)

FOREIGN PATENT DOCUMENTS

CN 1275196 A 11/2000
CN 10 5324641 A 2/2016
(Continued)

OTHER PUBLICATIONS

Office Action dated Jul. 23, 2019, in corresponding Chinese Application No. 201780015981.9.
(Continued)

*Primary Examiner* — David Z Huang
(74) *Attorney, Agent, or Firm* — Bacon & Thomas, PLLC

(57) ABSTRACT

In a sensor assembly, a deformation body has two oppositely lying surfaces, an outer edge segment and a sensor blade extending from a surface outward. A protective apparatus protects the deformation body from pressure surges or abrupt changes of temperature on its surface. The protective apparatus includes at least one plate, extending radially inwardly so that a cavity is formed, which accommodates a region of the sensor blade adjoining the deformation body and remote from the distal end of the sensor blade, forming a gap between the plate and sensor blade. A sensor formed by the sensor assembly and a transducer element coupled therewith can be used for registering pressure fluctuations in a flowing fluid, such as steam having a temperature of 400

(Continued)

C and/or, a pressure of greater than 140 bar in order to measure flow parameters of the fluid.

26 Claims, 3 Drawing Sheets

(56) References Cited

U.S. PATENT DOCUMENTS

| | | | |
|---|---|---|---|
| 6,352,000 | B1 | 3/2002 | Getman et al. |
| 6,910,387 | B2 | 6/2005 | Koudal et al. |
| 9,719,819 | B2 * | 8/2017 | Strub .................... G01F 1/3209 |
| 2004/0216532 | A1 | 11/2004 | Koudal et al. |
| 2006/0230841 | A1 | 10/2006 | Shrikrishna |
| 2008/0072686 | A1 | 3/2008 | Hoecker |
| 2011/0154913 | A1 | 6/2011 | Konyukhov et al. |
| 2011/0247430 | A1 | 10/2011 | Hertel et al. |

FOREIGN PATENT DOCUMENTS

| | | |
|---|---|---|
| DE | 8107108 U1 | 7/1981 |
| DE | 10 2013 105 363 A1 | 11/2014 |
| DE | 10 2014 112 558 A1 | 3/2016 |
| DE | 10 2016 104 423 A1 | 9/2017 |
| JP | 3248840 B2 | 11/2001 |
| JP | 2006-510003 A | 3/2006 |
| JP | 2015-535595 A | 12/2015 |
| WO | 00/09973 A1 | 2/2000 |

OTHER PUBLICATIONS

Office Action dated Aug. 27, 2019, in corresponding Japanese Application No. 2018-546843.
Office Action dated Dec. 4, 2019, in corresponding Japnese Application No. 2018-546843.
German Search Report, German PTO, Munich, dated Dec. 6, 2016.
International Search Report, EPO, The Netherlands, dated Apr. 24, 2017.

* cited by examiner

A3 – A3

B3 – B3

SENSOR ASSEMBLY FOR A SENSOR, SENSOR, AND MEASUREMENT SYSTEM FORMED THEREWITH

TECHNICAL FIELD

The invention relates to a sensor assembly having a deformation body, especially a membrane like and/or disk shaped, deformation body, as well as a sensor blade extending from a surface of the deformation body. Furthermore, the invention relates to a sensor formed by means of such a sensor assembly, to a measuring system formed therewith, and to its use for registering pressure fluctuations in a flowing fluid and/or for measuring at least one flow parameter of a fluid flowing in a pipeline.

BACKGROUND DISCUSSION

Used In process measurements- and automation technology for measuring flow velocities of fluids flowing in pipelines, especially fluids in the form of rapidly flowing and/or hot gases and/or fluid flows of high Reynolds number (Re), or volume- or mass flow rates corresponding to a flow velocity (u), are often measuring systems embodied as vortex-flow measuring devices. Examples of such measuring systems are known from, among others, US-A 2006/0230841, US-A 2008/0072686, US-A 2011/0154913, US-A 2011/0247430, U.S. Pat. Nos. 6,003,384, 6,101,885, 6,352,000, 6,910,387 or U.S. Pat. No. 6,938,496 and are also sold by Endress+Hauser, for example, under the designations, "PROWIRL D 200", "PROWIRL F 200", "PROWIRL O 200", "PROWIRL R 200". Such measuring systems have, in general, a bluff body protruding into the lumen of a pipeline, for example, a pipeline forming a component of a heat supply network or a turbine circulatory system, or into the lumen of a measuring tube installed into the course of the pipeline, consequently a bluff body flowed against by the fluid, for producing vortices aligned to form a so-called Kármán vortex street within the volume portion of the fluid flow flowing directly downstream from the bluff body. The vortices are, in such case, as is known, generated with a shedding rate ($1/f_{Vtx}$) on the bluff body dependent on the flow velocity of the fluid flowing in a principal flow direction through the measuring tube.

Furthermore, the measuring systems have, integrated in the bluff body, or connected with such or located downstream from the same, namely protruding into the region of the Karman vortex street into the flow, consequently into the lumen of the pipeline or measuring tube, a sensor, which serves to register pressure fluctuations in the Kármán vortex street formed in the flowing fluid and to convert such into a sensor signal representing the pressure fluctuations, namely to deliver a signal —, for example, an electrical or optical— signal, which corresponds to pressure reigning within the fluid and undergoing periodic fluctuations as a result of opposite sense vortices downstream from the bluff body, and which has a signal frequency ($\sim fv_{tx}$) corresponding to the shedding rate of the vortices.

The sensor includes a sensor assembly formed by means of a deformation body—most often a deformation body formed as a thin and essentially flat membrane—as well as a sensor blade—most often a plate-shaped, or wedge shaped, sensor blade —, extending from an essentially planar surface of the deformation body. The sensor assembly is adapted to register pressure fluctuations in the Kármán vortex street acting in a detection direction extending transversely to the actual principal flow direction, namely to convert such into movements of the deformation body corresponding to the pressure fluctuations, in such a manner that the sensor blade as a result of the pressure fluctuations executes pendulum-like movements in the detection direction for elastically deforming the deformation body, whereby deformation body and sensor blade are excited to execute forced oscillations about a shared static resting position. The deformation body includes, furthermore, a—most often annular—external edge segment, which is adapted to be connected, for example, via a material bonded connection, with a seat serving for mounting the deformation body, and the sensor formed therewith, hermetically sealedly to a wall of a pipeline or measuring tube, in such a manner that the deformation body closes and hermetically seals an opening in the wall of the pipeline or tube and that the surface of the deformation body carrying the sensor blade faces the fluid guiding lumen of the measuring tube or pipeline, such that the sensor blade protrudes inwardly into the lumen.

Since the deformation body is typically embodied membrane like, or disc shaped, a thickness of the inner segment of the deformation body carrying the sensor blade and bounded by the outer edge segment is most often very much less than a greatest diameter of an area of the segment bounded by the outer edge segment. In order to achieve a sufficiently high measuring sensitivity, namely a sufficiently high sensitivity of the sensor to the pressure fluctuations to be registered, deformation bodies of established measuring systems typically have a corresponding diameter-to-thickness-ratio, which lies, for instance, in the order of magnitude of 20:1. As disclosed in, among others, the above referenced U.S. Pat. No. 6,352,000, sensor assemblies of the aforementioned type can, in given cases, additionally have a balancing body, most often having a rod-, plate- or sleeve shaped form and extending from a surface of the deformation body facing away from the surface carrying the sensor blade. The balancing body serves, especially, to compensate forces, or moments, resulting from movements of the sensor assembly, for example, as a result of vibrations of the pipeline, or to prevent undesired movements of the sensor blade resulting therefrom.

For the purpose of generating the sensor signal, the sensor comprises, furthermore, a transducer element, for example, one formed by means of a capacitor mechanically coupled with the sensor assembly, or integrated therein or one formed by means of a piezo-stack serving as a piezoelectric transducer. The transducer element is adapted to register, and to modulate onto an electrical or optical carrier signal, movements of the deformation body, or movements of the balancing body present in given cases, not least of all also movements corresponding to pressure fluctuations.

The sensor assembly, and, thus, the sensor formed therewith, is, furthermore, connected on a side facing away from the fluid guiding lumen with a transmitter-electronics— typically a pressure- and shock resistantly encapsulated transmitter-electronics, which, in given cases, can also be hermetically sealed from the environment. Transmitter-electronics of industrial grade measuring systems have usually a corresponding digital measuring circuit electrically connected with the transducer element via connecting lines, in given cases, with interposed electrical barriers and/or galvanic separation locations and serving for processing the at least one sensor signal produced by the transducer element and for producing digital measured values for the measured variable to be registered, namely flow velocity, volume flow rate and/or mass flow rate. The transmitter-electronics of industrially usable measuring systems, or measuring systems established in industrial measurements technology, usually accommodated in a protective housing of metal and/or shock resistant plastic, provide additionally most often also an industrial standard, external interface, for example, one conforming to DIN IEC 60381-1, for communication with superordinated measuring- and/or control systems, for example, such formed by means of programmable logic controllers (PLC). Such external interfaces can be embodied, for example, as two-conductor connections of an electrical current loop and/or they can be embodied to be compatible with established industrial fieldbusses.

Due to the relatively high diameter-to-thickness-ratio of the deformation body resulting from the principle of measurement, conventional sensors of the type being discussed can—in the case of application of a high strength, nickel based alloy, such as e.g. Inconel 718 (Special Metals Corp.), as material for the deformation body—in applications actually predestined for such sensors with fluid temperatures of above 400° C., such as e.g. (hot-) steam applications, have, as time goes on, increased measuring errors, namely measuring errors significantly exceeding a specification of the respective measuring system. This can in steam applications be attributed to, among others, the fact that the sensor assembly, especially its deformation body, for example, as a result of so called condensation induced water hammers (CIWH), is exposed for short times to very high pressures with pressure spikes of above 140 bar, or to strong pressure surges and/or extremely strong temperature fluctuations, accompanied by equally superelevated deformations of the deformation body, namely deformations exceeding loading limits specified for the measuring system. The aforementioned deformations can, in given cases, even be plastic deformations, and, consequently, irreversible.

SUMMARY OF THE INVENTION

Starting from the above described state of the art, an object of the invention is so to improve the construction of sensor assemblies of the type being discussed that sensors formed therewith have as compared with conventional sensors less sensitivity to pressure surges, or temperature fluctuations, consequently an improved accuracy of measurement even in the case of hot steam exposures accompanied by condensation induced water hammers.

For achieving the object, the invention resides in a sensor assembly for a sensor —, for example, a sensor assembly for a sensor for registering pressure fluctuations in a Kármán vortex street formed in a flowing fluid and/or a sensor assembly adapted to be contacted by a flowing fluid —, which sensor assembly comprises:
  a deformation body, for example, a membrane like, and/or disk shaped, deformation body, having a first surface, an oppositely lying, second surface, especially a second surface at least partially parallel to the first surface, and an outer edge segment, for example, an annular outer edge segment and/or one provided with a sealing surface;
  a sensor blade extending from the first surface of the deformation body out to a distal end, for example, a plate-shaped or wedge shaped, sensor blade; as well as
  a protective apparatus for protection of the deformation body from pressure surges exerted against its first surface and/or for protection of the deformation body from abrupt changes of temperature on its first surface, wherein the protective apparatus has at least one plate adjoining the edge segment of the deformation body and extending radially inwardly in the direction of the sensor blade, in such a manner that
    between plate and deformation body a cavity is formed, for example, an annular, or washer-shaped, cavity, which accommodates a region of the sensor blade adjoining the first surface of the deformation body and remote from the distal end of the sensor blade, and
    a gap, for example, an annular gap, is formed between plate and sensor blade.

Moreover, the invention resides in a sensor for registering pressure fluctuations in a flowing fluid, for example, for registering pressure fluctuations in a Kármán vortex street formed in the flowing fluid, which sensor comprises such a sensor assembly as well as a transducer element for generating a sensor signal, for example, an electrical or optical, sensor signal, representing movements of the sensor blade changing as a function of time, for example, at least at times periodic movements of the sensor blade, and/or representing deformations of the deformation body changing as a function of time, for example, at least at times periodic deformations of the deformation body.

Furthermore, the invention resides in a measuring system for measuring at least one flow parameter, for example, a flow parameter changeable as a function of time, for example, a flow velocity and/or a volume flow rate, of a fluid flowing in a pipeline, which measuring system comprises a sensor for registering pressure fluctuations in the flowing fluid, for example, for registering pressure fluctuations in a Kármán vortex street formed in the flowing fluid, as well as a measuring-electronics, which is adapted to receive and to process the sensor signal, for example, to generate measured values representing the at least one flow parameter.

A further aspect the invention is to use such a measuring system for measuring a flow parameter —, for example, a flow velocity and/or a volume flow rate and/or a mass flow rate—of a fluid, for example, a vapor, flowing in a pipeline, for example, a fluid having at least at times a temperature of greater than 400° C. and/or acting at least at times with a pressure of greater than 140 bar on the deformation body and/or on the sensor blade of the sensor.

In a first embodiment of the sensor assembly of the invention, it is provided that the plate of the protective apparatus is spaced both from the deformation body as well as also from the sensor blade.

In a second embodiment of the sensor assembly of the invention, it is provided that the plate of the protective apparatus contacts neither the deformation body nor the sensor blade.

In a third embodiment of the sensor assembly of the invention, the sensor blade is adapted to be immersed in a fluid, or to be flowed around by a fluid in a region extending between its distal end and the plate. Developing this embodiment of the invention further, the cavity is, furthermore, adapted to accommodate a volume portion of the fluid, or via the gap, especially namely only via the gap, to be filled by a volume portion of the fluid.

In a fourth embodiment of the sensor assembly of the invention, the sensor blade is adapted to be inserted into a lumen of a tube or pipe guiding a flowing fluid, or to be flowed around in a region extending between its distal end and the plate by a fluid guided in the lumen of the tube. Developing this embodiment of the invention further, the cavity is, furthermore, adapted to communicate via the gap, especially namely only via the gap, with the lumen of the tube or pipe.

In a fifth embodiment of the sensor assembly of the invention, it is provided that the plate is formed by means of two, especially exactly two, plate segments, especially equally constructed, or equally large, plate segments, for example, in such a manner that the two plate segments lie opposite one another to form mutually facing edges transitioning into the annular gap. Developing this embodiment of the invention further, it is, additionally, provided that the two plate segments are connected together at least sectionally by material bonding, for instance, in such a manner that the two plate segments are welded, brazed or soldered together at mutually opposing, facing edges.

In a sixth embodiment of the sensor assembly of the invention, the deformation body and the sensor blade are, furthermore, adapted to be excited to execute, for example, forced, oscillations about a shared static resting position and, in such case, to be moved relative to the protective apparatus, in such a manner that the sensor blade executes pendulum-like movements elastically deforming the deformation body.

In a seventh embodiment of the sensor assembly of the invention, the deformation body, the sensor blade and the protective apparatus are so dimensioned and arranged that, in the case of sensor blade located together with the deformation body in a shared static resting position, these do not contact the plate of the protective apparatus.

In an eighth embodiment of the sensor assembly of the invention, the deformation body, the sensor blade and the protective apparatus, especially namely the plate of the protective apparatus, are so dimensioned and arranged that the gap, in the case of sensor blade located together with the deformation body in shared static resting position, has a minimum gap width, which is greater than 0.02 mm and/or less than 0.5 mm.

In a ninth embodiment of the sensor assembly of the invention, the deformation body, the sensor blade and the protective apparatus, especially namely the plate of the protective apparatus, are so dimensioned and arranged that the gap, in the case of sensor blade located together with the deformation body in shared static resting position, has a maximum gap width, which is less than 0.5 mm and/or greater than 0.02 mm.

In a tenth embodiment of the sensor assembly of the invention, it is provided that the plate of the protective apparatus is composed at least partially, for example, predominantly or completely, of a metal, such as e.g. a stainless steel, or a nickel based alloy.

In an eleventh embodiment of the sensor assembly of the invention, it is provided that the deformation body and the plate of the protective apparatus are composed of the same material.

In a twelfth embodiment of the sensor assembly of the invention, it is provided that the deformation body and the plate of the protective apparatus are components of one and the same, monolithic, formed part, for example, cast or manufactured by 3D-laser melting.

In a thirteenth embodiment of the sensor assembly of the invention, it is provided that deformation body and sensor blade are components of one and the same, monolithic, formed part, for example, cast or manufactured by 3D-laser melting.

In a fourteenth embodiment of the sensor assembly of the invention, it is provided that deformation body and the plate of the protective apparatus are connected together by material bonding, for example, welded, brazed or soldered together.

In a fifteenth embodiment of the sensor assembly of the invention, it is provided that deformation body and sensor blade are connected together by material bonding, for example, welded, brazed or soldered together.

In a first embodiment of the measuring system of the invention, it is provided that in the wall of the tube or pipe an opening is provided, for example, an opening having a seat serving for mounting the deformation body on the wall, and that the sensor is inserted into the opening, in such a manner that the deformation body covers the opening, for example, hermetically seals it, and that the first surface of the deformation body faces the lumen of the tube or pipe, such that the sensor blade protrudes inwardly into the lumen.

Developing this embodiment of the invention further, it is, additionally, provided that the opening has a seat serving for mounting the deformation body on the wall. Furthermore, at least one sealing surface can be formed in the seat, for example, a surrounding and/or annular, sealing surface. Moreover, additionally also at least one sealing surface, for example, a surrounding and/or annular sealing surface, can be formed in the edge segment, and the sealing surface as well as the sealing surface of the seat can be adapted for a hermetic sealing of the opening, for example, also with at least one seal interposed.

In a first further development of the measuring system of the invention, such further comprises a tube insertable into the course of the pipeline and having a lumen, which is adapted to guide the fluid flowing in the pipeline, wherein the sensor is inserted into the tube in such a manner that the first surface of the deformation body faces the lumen of the tube and the sensor blade protrudes inwardly into the lumen.

In a first embodiment of the first further development of the measuring system, it is, additionally, provided that the sensor blade has a length, measured as minimum distance between a proximal end of the sensor blade, namely an end bordering on the deformation body, to a distal end of the sensor blade, namely an end remote from the deformation body, or its surface, wherein the length is less than 95% of a caliber of the tube and/or greater than half of the caliber.

In a second further development of the measuring system of the invention, such further comprises a tube insertable into the course of the pipeline and having a lumen, which is adapted to guide the fluid flowing in the pipeline, wherein an opening is provided in the wall of the tube, especially an opening having a seat serving for mounting the deformation body on the wall, and wherein the sensor is inserted into the opening, in such a manner that the deformation body covers the opening, especially hermetically seals it, and that the first surface of the deformation body faces the lumen of the tube, such that the sensor blade protrudes inwardly into the lumen.

In a first embodiment of the second further development of the measuring system, it is, additionally, provided that the sensor blade has a length, measured as minimum distance between a proximal end of the sensor blade, namely an end bordering on the deformation body, to a distal end of the sensor blade, namely an end remote from the deformation body, or its surface, wherein the length is less than 95% of a caliber of the tube and/or greater than half of the caliber.

In a third further development of the measuring system of the invention, such further comprises a bluff body arranged in the lumen of the tube and adapted to bring about a Kármán vortex street in the flowing fluid.

A basic idea of the invention is to provide the low sensitivity to pressure surges, or temperature fluctuations, desired for the sensor assembly by, on the one hand, shielding the deformation body from the flowing fluid during operation by means of a plate placed in front of it and spaced therefrom and, on the other hand, by providing between the plate and the deformation body a cavity open toward the lumen of the fluid guiding tube, namely a cavity communicating with the lumen via a gap formed between plate and sensor blade. During operation of the measuring system, the cavity is filled with fluid. In operation of the sensor assembly of the invention, or of the measuring system formed therewith, the fluid volume enclosed in the cavity as well as the plate act together as a thermal lowpass filter damping possible temperature fluctuations, or the deformation body, the gap as well as the fluid volume enclosed in the cavity act together additionally also as a lowpass filter damping possible pressure surges, i.e. virtually as a Helmholtz-resonator absorbing possible pressure surges.

An advantage of the invention, among others, is that therewith, not only in very simple equally as well very effective manner, a considerable lessening of the sensitivity to pressure surges, or temperature fluctuations, of sensors of the type being discussed can be achieved, but, also, that this additionally also can be achieved, without thereby mentionably lessening the measuring sensitivity, namely the sensitivity of the sensor to the pressure fluctuations actually to be registered. A typically required, high accuracy of measurement—not least of all also for industrial application—remains. A further advantage of the invention is that the sensor assembly of the invention can, moreover, have the same basic construction as known sensor assemblies of conventional sensors, or measuring systems formed therewith. Moreover, the deformation body and the sensor blade of the sensor assembly of the invention can also have, in principle, the same construction, or be manufactured of the same materials, as conventional deformation bodies, or sensor blades.

The invention as well as advantageous embodiments thereof will now be explained in greater detail based on examples of embodiments shown in the figures of the drawing. Same, or equally acting or equally functioning, parts are provided in all figures with equal reference characters; when perspicuity requires or it otherwise appears sensible, already mentioned reference characters are omitted in subsequent figures. Other advantageous embodiments or further developments, especially also combinations of, firstly, only individually explained aspects of the invention, will become evident, furthermore, from the figures of the drawing and/or from the claims. The figures of the drawing show as follows:

DETAILED DESCRIPTION IN CONJUNCTION WITH THE DRAWINGS

Figure 1:
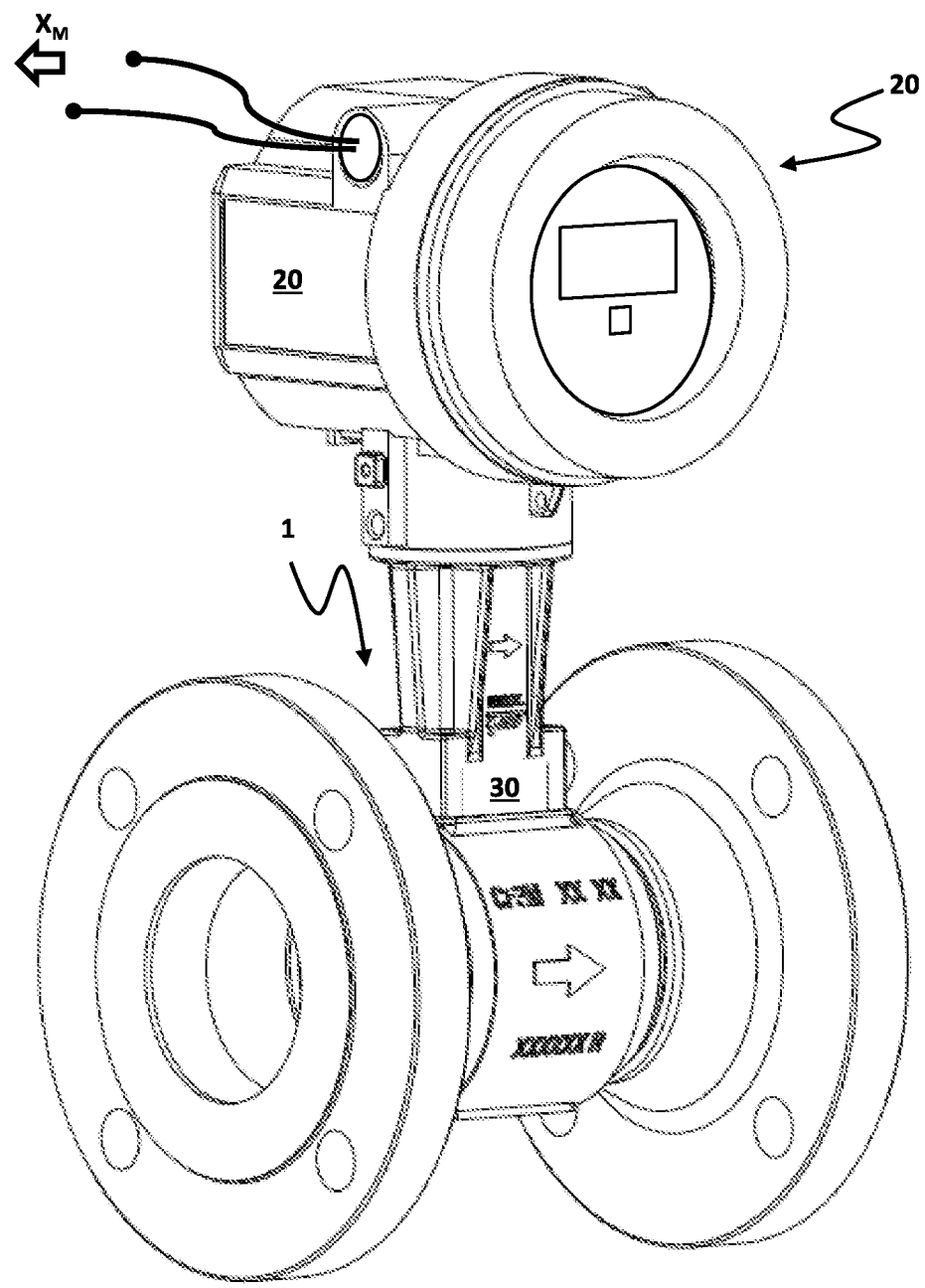
FIGS. 1 and 2 schematically in different views, show a measuring system—here embodied as a vortex flow measuring device—including a sensor and a measuring electronics, for measuring at least one flow parameter of a fluid flowing in a pipeline.
Figure 2:
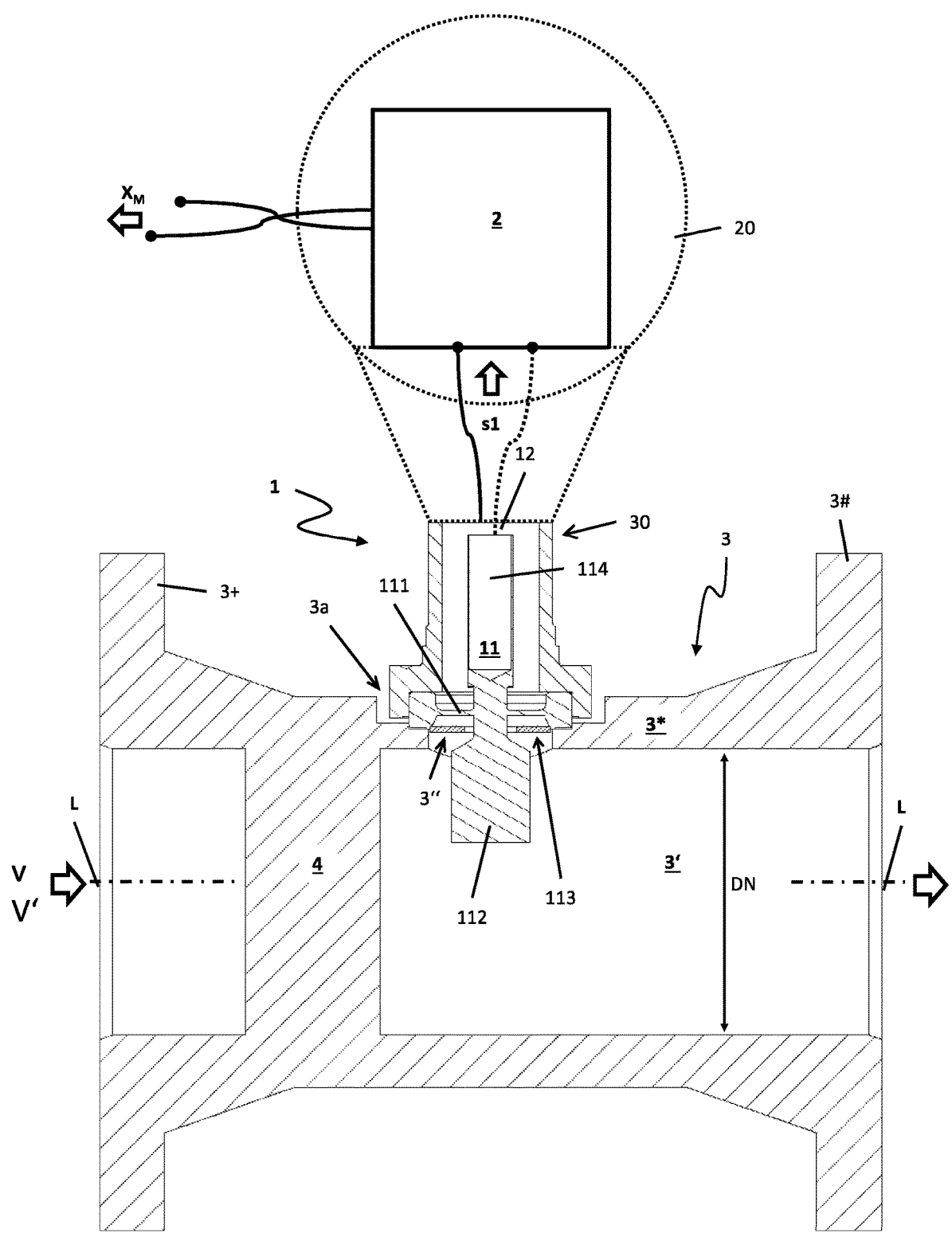

Shown in FIGS. 1 and 2 is an example of an embodiment for a measuring system for measuring at least one flow parameter, in given cases, also a flow parameter changeable as a function of time, thus a flow parameter such as e.g. a flow velocity v and/or a volume flow rate V', of a fluid flowing in a pipeline, for example, a hot gas, especially one at least having at times a temperature of greater than 400° C., and/or at least at times being under a high pressure, especially a pressure greater than 140 bar. The pipeline can be embodied, for example, as a plant component of a heat supply network or a turbine circulatory system, consequently the fluid can be, for example, steam, especially also saturated steam or superheated steam, or, for example, also a condensate drained from a steam line. The fluid can, however, also be, for example, a (compressed) natural gas or a biogas, such that the pipeline can be, for example, also a component of a natural gas or biogas plant or a gas supply grid.

The measuring system includes a sensor 1, which is provided, and embodied, to register pressure fluctuations in the fluid flowing in a principal flow direction past the sensor and to convert such into a sensor signal s1, for example, an electrical or optical, sensor signal, corresponding to the pressure fluctuations. As evident from the combination of FIGS. 1 and 2, the measuring system comprises, furthermore, a measuring electronics 2 —, for example, one accommodated in a pressure- and/or shock resistant, protective housing 20. Measuring electronics 2 is connected with the sensor 1, or communicates with the sensor 1 during operation of the measuring system. Measuring electronics 2 is adapted, especially, to receive and to process the sensor signal s1, for example, to generate measured values $X_M$ representing the at least one flow parameter, for example, thus flow velocity v, or volume flow rate V. The measured values $X_M$ can, for example, be displayed on-site and/or transmitted—by wire via connected fieldbus and/or wirelessly per radio—to an electronic data processing system, for instance, a programmable logic control unit (PLC) and/or a process control station. The protective housing 20 for the measuring electronics 2 can, for example, be made of a metal, for instance, a stainless steel or aluminum, and/or be produced by means of a casting method, such as e.g. an investment casting- or a pressure casting method (HPDC); it can, however, also be formed, for example, by means of a plastic, molded part manufactured in an injection molding method.

Sensor 1 comprises, as well as also shown in each of FIG. 2 and FIGS. 3a, 3b, 3c, 3d, or as directly evident from a combination of these figures, a sensor assembly 11, which is formed by means of a deformation body 111, especially a membrane like, or disk shaped deformation body 111, as well as a sensor blade 112, which has a left side, first lateral surface 112+, as well as a right side, second lateral surface 112 #, and which extends from a first surface 111+ of the deformation body 111 to a distal (free) end, namely an end remote from the deformation body 111, or its surface 111+. The deformation body 111 includes, furthermore, a second surface 111 # oppositely lying to the first surface 111+, for example, a second surface at least partially parallel to the first surface 111+, as well as an external edge segment 111a, for example, an annular external edge segment and/or one equipped with a sealing surface. The outer edge segment 111a has a thickness, which—as shown in FIG. 2, or FIGS. 3a, 3b, 3c, 3d—is significantly greater than a minimum thickness of an inner segment 111b (here namely the segment carrying the sensor blade 112) surrounded by the edge segment 111a.

Deformation body 111 and sensor blade 112 of the sensor assembly 11 of the invention are adapted, especially, to be excited to execute—typically forced—oscillations about a shared static resting position, in such a manner that the sensor blade 112 executes pendulum-like movements in a detection direction extending essentially transversely to the aforementioned principal flow direction for elastically deforming the deformation body 111. The sensor blade 112 has accordingly a width b (measured as a maximum size in the direction of the principal flow direction), which is significantly greater than a thickness d of the sensor blade 112, measured as a maximum lateral extension in the detection direction. In the example of an embodiment illustrated in FIGS. 3a, 3b, 3c, 3d, the sensor blade 112 is additionally essentially wedge shaped; it can, however, for example, also be embodied, such as quite usual in the case of such sensor assemblies, or sensors formed therewith, as a relatively thin, planar plate.

Deformation body 111 and sensor blade 112 can, furthermore, be, for example, components of one and the same monolithic, formed part, which is produced, for example, by casting or by a generative method, such as, for instance, 3D-laser melting; Deformation body and sensor blade can, however, also be embodied as, firstly, mutually separated, individual parts, and only thereafter connected together by material bonding, for example, welded, brazed or soldered together, consequently be produced from corresponding materials connectable together by material bonding. The deformation body 111 can—such as quite usual in the case of such sensor assemblies—be composed, at least partially, for example, predominantly or completely, of a metal, such as e.g. stainless steel, or a nickel based alloy. Likewise also the sensor blade can be composed at least partially of a metal, for example a stainless steel, or a nickel based alloy; especially the deformation body 111 and the sensor blade 112 can also be composed of the same material.

Besides the sensor assembly 11, the sensor comprises, furthermore, a transducer element 12 —, for example, one embodied as a piezoelectric transducer, a capacitive transducer embodied as a component of a capacitor, or an optical transducer, for example, embodied as a component of a photodetector,—for generating a signal, here also serving as sensor signal, changing as a function of time—typically namely at least at times periodic—and representing movements of the sensor blade, or deformations of the deformation body 111 equally changing as a function of time, for example, a signal in the form of a variable electrical voltage modulated by the aforementioned movements or a signal in the form of correspondingly modulated laser light.

In an additional embodiment of the invention, the measuring system comprises, furthermore, a tube 3 insertable into the course of the aforementioned pipeline and having, surrounded by a wall 3* of the tube —, for example, a metal wall—a lumen 3', which extends from an inlet end 3+ to an outlet end 3 # and which is adapted to guide the fluid flowing in the pipe. Sensor 1 is additionally inserted into the tube in such a manner that the first surface of the deformation body 111 faces the lumen 3' of the tube, such that the sensor blade protrudes inwardly into the lumen. In the example of an embodiment shown here, there is provided on the inlet end 3+, as well as also on the outlet end 3 #, furthermore, in each case, a flange serving for forming a leakfree flange connection with corresponding flanges on inlet and outlet end, line segments of the pipeline. Furthermore, the tube 3 can, as shown in FIG. 1 or 2, be embodied essentially straight, for example, as a hollow cylinder of circularly shaped cross section, in such a manner that the tube 3 has an imaginary, straight, longitudinal axis L imaginarily connecting the inlet end 3+ and the outlet end 3 #. Sensor 1 is in the example of an embodiment shown in FIGS. 1 and 2 inserted from the exterior through an opening 3" formed in the wall into the lumen of the tube and affixed in the region of the opening —, for example, also releasably—externally on the wall 3*, and, indeed, such that the surface 111+ of the deformation body 111 faces the lumen 3' of the tube 3, such that the sensor blade 112 protrudes inwardly into the lumen. Especially, the sensor 1 is so inserted into the opening 3" that the deformation body 111 covers the opening 3", and hermetically seals it. The opening can, for example, be so embodied that it—such as quite usual in the case of measuring systems of the type being discussed—has an (inner-)diameter, which lies in a range between 10 mm and about 50 mm.

In an additional embodiment of the invention, there is formed in the opening 3" a seat 3a serving for mounting the deformation body on the wall 3*. Sensor 1 can, in such case, be affixed on the tube 3 for example, by material bonded connecting, especially namely by welding, brazing or soldering, of deformation body 111 and wall 3*; it can, however, for example, also be connected releasably with the pipe 3, for example, affixed with screws, or screwed on. Formed in the seat 3a can be, furthermore, at least one, for example, also surrounding, or annular, sealing surface, which is adapted in cooperation with the deformation body 111 and a sealing element provided, in given cases, for example, an annular or washer-shaped, sealing element, correspondingly to seal the opening 3". Particularly for the case, in which the sensor assembly is inserted into the above-referenced seat 3a and should be connected releasably with the pipe 3, also the edge segment 111a of the deformation body 111 can in advantageous manner, be provided, furthermore, with a sealing surface, for example, also one corresponding with the sealing surface provided, in given cases, in the opening 3" and/or an annular, sealing surface.

In the example of an embodiment shown here, the measuring system is embodied especially as a vortex flow measuring device having a bluff body 4 arranged in the lumen of the tube 3—here namely upstream of the sensor 1 —, and serving to bring about a Kármán vortex street in the flowing fluid. Sensor and bluff body are, in such case, especially, so dimensioned and arranged that the sensor blade 112 protrudes inwardly into such a region in the lumen 3* of the tube, or the fluid guided therein, which during operation of the measuring system is regularly occupied by a (steady-state) Kármán vortex street, so that the pressure fluctuations registered by means of the sensor 1 are periodic pressure fluctuations caused by vortices shed on the bluff body 4 with a shedding rate ($\sim 1/fv_{tx}$) and the sensor signal s1 has a signal frequency ($\sim fv_{tx}$) corresponding to the shedding rate of the vortices. In the example of an embodiment shown here, the vortex flow measuring device is additionally embodied as a measuring system of compact construction, wherein the measuring electronics 2 is accommodated in a protective housing 20 held on the tube —, for example, by means of a neck shaped connecting nozzle 30.

In an additional embodiment of the invention, the sensor 1 and the tube 3 are, furthermore, so dimensioned that a length l of the sensor blade 112, measured as minimum distance between a proximal end of the sensor blade 112, namely an end bordering on the deformation body 111, and the distal end of the sensor blade 112 is greater than half a caliber DN of the tube 3, or less than 95% of the caliber DN. The length l can also be so selected, for example,—such as quite usual in the case of comparatively small calibers of less than 50 mm—that the distal end of the sensor blade 112 has only a very small minimum separation from the wall 3* of the tube 3. In the case of tubes with comparatively large calibers of 50 mm or more, the sensor blade 112 can—such as quite usual in the case of measuring systems of the type being discussed, respectively, as well as also evident from FIG. 2 —, for example, also be embodied significantly shorter than half a caliber of the tube 3.

As already mentioned, the sensor assembly (and thus the sensor formed therewith, and the measuring system formed therewith) is especially also provided to be applied in measuring points, where in the fluid to be measured, for example, due to condensation induced, water hammering (CIWH), momentarily extremely high hydrostatic pressures of far above 100 bar can occur, namely pressures acting perpendicularly against the wall 3\* of the tube, consequently pressures acting equally against the sensor assembly, for example, in hot steam treatments with fluid temperatures of above 400° C. Moreover, the sensor assembly is especially also provided for measuring points, where the fluid to be measured can have very inhomogeneous temperature distributions, in such a manner that the sensor assembly is exposed, as a result, to extreme temperature fluctuations as a function of time.

For achieving an as small as possible sensitivity of the sensor to pressure surges and/or temperature fluctuations of the aforementioned type, or for lessening measurement errors resulting from such high loadings of the sensor in the case of measuring the at least one flow parameter with the measuring system formed with the sensor, the sensor assembly 1 of the invention comprises, as well as also schematically shown in FIGS. 1, 2, 3c, 3d, furthermore, a protective apparatus 113 for protection of the deformation body 111 from pressure surges on its first surface 111+—in the case of the example of an embodiment shown in FIG. 1, the surface facing the lumen of the tube 3—and/or for protection of the deformation body 111 from abrupt changes of temperature on the surface 111+. The protective apparatus 113 includes, adjoining the edge segment 111a of the deformation body 111, at least one plate 113a, which extends radially inwardly in the direction of the sensor blade, and, indeed, such that between plate 113a and deformation body a cavity 113', for example, an essentially annular, or washer-shaped, cavity, is formed, which accommodates a region of the sensor blade adjoining the surface 111+ of the deformation body 111 and remote from the distal end of the sensor blade, and such that between plate and sensor blade a gap 113" is formed, for example, an essentially annular gap. As shown in FIGS. 1, 2, 3c, 3d, in each case, or as directly evident from a combination of such figures, the plate 113a of the protective apparatus 113 is, in at least the case of deformation body 111 and sensor blade 112 located in a shared static resting position, spaced both from the deformation body 111 as well as also from the sensor blade 112, or so embodied and arranged that it contacts neither the deformation body 111 located in the static resting position nor the sensor blade 112 located in the static resting position. Cavity 113' is open to the outside—in the case of the installed situation shown in FIG. 1 namely to the lumen of the tube—via gap 113", in such a manner that the cavity during operation of the measuring system formed by means of the sensor assembly, or in the case of the installed situation shown in FIG. 1, communicates via the gap with the lumen of the tube, or that the cavity is filled by a volume portion of the fluid via the gap, such that during operation of the measuring system it accommodates a volume portion of the fluid, or in such a manner that the sensor blade 112 protruding into the lumen is flowed around by the fluid to be measured (only) in a region extending between its distal end and the plate. In an additional embodiment of the invention, it is provided that the gap 113" forms the single fluid connection of the cavity 113' to the outside, thus to the lumen of the tube 3, in such a manner that the cavity 113' communicates with the lumen 3' of the tube only via the gap 113", or during operation can be filled with fluid guided in the lumen of the tube only via the gap. In an additional embodiment of the invention, the deformation body 111, the sensor blade and the protective apparatus, or its plate, are so dimensioned and so arranged that, in the case of sensor blade 112 located together with the deformation body 111 in shared static resting position, the former does not contact the plate 113a of the protective apparatus 113; this, especially, also in such a manner that the sensor blade 112, even in the case of performance of pendulum-like movements lying within a specification of the sensor assembly, or of the sensor formed therewith, does not contact the plate 113a.

By application of the protective apparatus 113 of the invention, the deformation body 111 is, on the one hand, shielded by means of the therefrom spaced, frontally placed plate 113a from the fluid flowing during operation. Thus, the deformation body 111 is contacted during operation most often not by flowing, but, instead, only by essentially resting fluid, or by fluid circulating, in given cases, just within the cavity 113'. Additionally, on the other hand, the fluid volume enclosed in the cavity 113' as well as the plate 113a act together as a thermal lowpass filter damping possible temperature fluctuations, or the deformation body 111, the gap 113" as well as the fluid volume enclosed in the cavity 113' act together additionally also as a lowpass filter damping possible pressure surges. Moreover, the deformation body 111 and the protective apparatus 113 can also form together with the fluid volume located in the cavity 113' and in the gap 113" a so-called Helmholtz-resonator, of which an eigenfrequency is determined by a mass and elasticity of the fluid volume as well as by shapes and sizes of the cavity 113' and the gap 113". The Helmholtz-resonator is, for example, able to convert (sound-)energy carried in with the pressure surges into kinetic energy of the aforementioned enclosed fluid volume, in such a manner that, as a result, energy carried in by pressure surges is at least partially also absorbed by oscillations of the fluid volume located in the cavity 113' and in the gap 113", and, consequently, kept away from the deformation body 111.

In order to assure, on the one hand, that the sensor blade located (together with the deformation body) in static resting position actually does not contact the plate of the protective apparatus, equally as well that a sufficiently high flow resistance against fluid flowing in the direction of the cavity is provided and, on the other hand, that the pendulum-like movements of the sensor blade 112 elastically deforming the deformation body 111 can nevertheless have a sufficient maximum deflection for registering the pressure fluctuations, or for ascertaining a shedding rate of vortices causing periodic pressure fluctuations, the deformation body, the sensor blade and the protective apparatus according to an additional embodiment of the invention are so dimensioned and arranged that the gap 113", in the case of sensor blade located together with the deformation body in shared static resting position, has a minimum gap width, which is greater than 0.02 mm and/or less than 0.5 mm, and/or that the gap in the case of sensor blade located together with the deformation body in shared static resting position has a maximum gap width, which is less than 0.5 mm and/or greater than 0.02 mm. Since the gap has a gap width of at least 0.02 mm, it is possible—in addition to assuring the above-referenced sufficiently large amplitude of the pendulum-like movements of the sensor blade serving for registering pressure fluctuations for the measurements—additionally also to achieve a sufficiently rapid initial filling with fluid to be measured of the cavity, initially, not filled with the fluid to be measured.

Figure 3A:
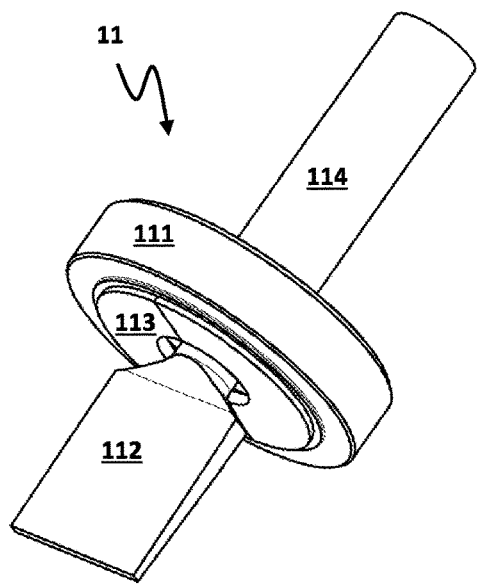
FIGS. 3a, 3b, 3c and 3d schematic, partially also sectional views of a sensor assembly for a sensor, especially one suitable for application in a measuring system of FIG. 1, or 2.
Figure 3B:
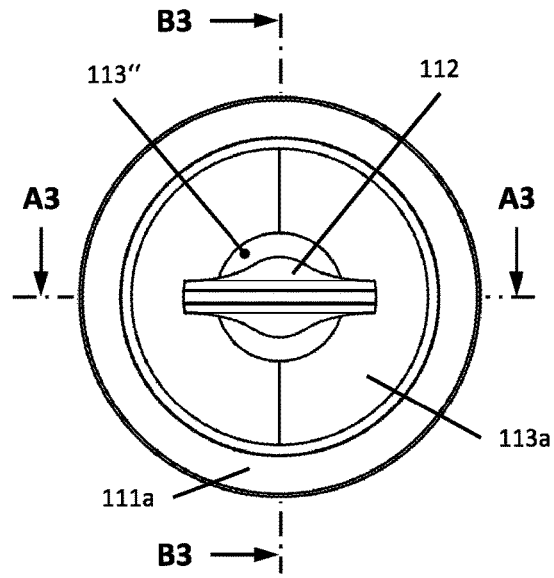
Figure 3C:
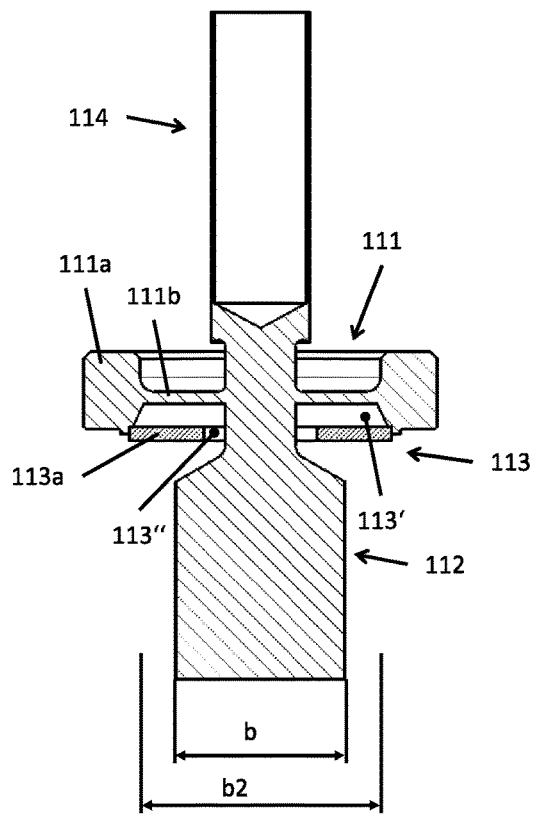
Figure 3D:
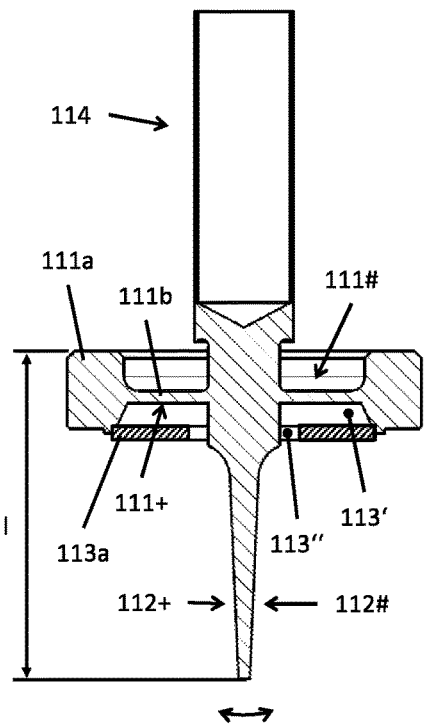

The plate 113a can be, for example, at least partially, especially, however, also predominantly or completely, composed of a metal, such as, for instance, a stainless steel, or a nickel based alloy. Additionally, it can also be advantageous to manufacture deformation body 111 and plate 113a, in given cases, also the sensor blade, of the same material. Furthermore, the deformation body as well as the plate of the protective apparatus can be, for example, also integral components of one and the same monolithic, formed part, for example, also in such a manner that deformation body, sensor blade and plate are a single monolithic, formed part. The monolithic, formed part can be, for example, a casting or a formed part, especially of a metal, manufactured by a generative method, such as e.g. 3D laser melting. The deformation body 111 and the plate 113a of the protective apparatus can, however, for example, also be joined to one another, namely connected together by material bonding, especially namely welded, brazed or soldered together. In an additional embodiment of the invention, it is provided that the plate 113a of the protective apparatus, not least of all for the purpose of simplifying the manufacturing of the protective apparatus, is formed by means of at least two, or by means of exactly two, plate segments, for example, in such a manner that the plate segments —, as well as also shown in FIGS. 3a and 3b, in each case, or directly evident from their combination—lie opposite one another with, in each case, an edge defining and abutting on the annular gap. The plate segments can additionally be of equal construction, or equally large. In case required, for instance, for reasons of the mechanical stability of the plate 113a ultimately formed by means of the plate segments and/or for reasons of keeping the size of the ultimately formed gap 113" as small as possible, the at least two plate segments can, furthermore, also be sectionally connected together by material bonding, for instance, in such a manner that the plate segments are welded, brazed or soldered together on mutually opposing, or mutually contacting, facing edges.

For compensating forces and/or moments resulting from possible movements of the sensor assembly—, for instance, as a result of vibration of the above-referenced pipeline connected to the tube—, or for preventing undesired, namely sensor signal s1 corrupting, movements of the sensor blade, or of the deformation body 111, resulting therefrom, the sensor assembly 11, according to an additional embodiment of the invention, includes, furthermore, a balancing body 114, for example, a rod-, plate- or sleeve-shaped balancing body, extending from the second surface 111 # of the deformation body 111. The balancing body 114 can additionally serve also as a holder for transducer element 12 or even as a component of the transducer element 12, for example, as a movable electrode of a capacitor forming the (capacitive) transducer element. The balancing body 114 can be composed, for example, of the same material as the deformation body and/or the sensor blade, for example, a metal. For example, the balancing body 114 can be produced namely from a stainless steel, or a nickel based alloy. In an additional embodiment of the invention, deformation body 111 and balancing body 114 are connected together by material bonding, for example, welded, brazed or soldered together, consequently it is provided to manufacture balancing body 114 and deformation body 111 from materials correspondingly connectable together by material bonding. Alternatively, deformation body 111 and balancing body 114 can, however, also be components of one and the same monolithic, formed part, for example, also in such a manner that sensor blade 112, deformation body 111 and balancing body 114 are components of the formed part. Sensor blade 112 and balancing body 114 can, furthermore,—as well as also evident from FIGS. 3c and 3d—be arranged aligned with one another, in such a manner that a lengthened principal axis of inertia of the sensor blade 112 coincides with a principal axis of inertia of the balancing body 114. Alternatively or supplementally, the balancing body 114 and the deformation body 111 can additionally be so positioned and oriented relative to one another that a lengthened principal axis of inertia of the deformation body 111 coincides with a principal axis of inertia of the balancing body 114. Moreover, sensor blade 112, balancing body 114 and deformation body 111 can also be so positioned and oriented relative to one another that—such as, for example, also evident from a combination of FIGS. 2, 3a, 3b, 3c and 3d—a principal axis of inertia of the sensor assembly 11 extends parallel both to a principal axis of inertia of the sensor blade 112 as well as also to a principal axis of inertia of the balancing body 114, as well as also to a principal axis of inertia of the deformation body 111 or coincides both with the principal axis of inertia of the sensor blade as well as also with the principal axis of inertia balancing body, as well as also with the principal axis of inertia of the deformation body.

The invention claimed is:

1. A sensor assembly for a sensor, which sensor assembly comprises:
   a deformation body including a first surface, an oppositely lying, second surface and an outer edge segment;
   a sensor blade extending from said first surface of said deformation body out to a distal end, as well as;
   a protective apparatus for protection of said deformation body from pressure surges exerted against said first surface and/or for protection of said deformation body from changes of temperature on said first surface, wherein:
   said protective apparatus includes at least one plate adjoining said outer edge segment of said deformation body and extending radially inwardly in the direction of said sensor blade, in such a manner that:
   between said plate and said deformation body a cavity is formed which accommodates a region of said sensor blade adjoining said first surface of said deformation body and remote from the distal end of said sensor blade; and
   a gap formed between said plate and said sensor blade; and
   wherein said deformation body, said sensor blade and said protective apparatus are so dimensioned and arranged that said gap, in the case of said sensor blade located together with said deformation body in a shared static resting position, shows a maximum gap width, which is less than 0.5 mm.

2. The sensor assembly as claimed in claim 1, wherein: said plate of said protective apparatus is spaced both from said deformation body as well as also from said sensor blade.

3. The sensor assembly as claimed in claim 1, wherein: said plate of said protective apparatus contacts neither said deformation body nor said sensor blade.

4. The sensor assembly as claimed in claim 1, wherein: said sensor blade is adapted to be immersed in a fluid, or to be flowed around by a fluid in a region extending between its distal end and the plate.

5. The sensor assembly as claimed in claim 4, wherein: said cavity is adapted to accommodate a volume portion of the fluid, or via said gap, only via said gap, to be filled by a volume portion of the fluid.

6. The sensor assembly as claimed in claim 1, wherein: said sensor blade is adapted to be inserted into a lumen of a tube or pipe guiding a flowing fluid, or to be flowed around in a region extending between its distal end and said plate by a fluid guided in the lumen of the tube or pipe.

7. The sensor assembly as claimed in claim 6, wherein:
said cavity is adapted to communicate via said gap, and only via said gap, with the lumen of the tube or pipe.

8. The sensor assembly as claimed in claim 1, wherein:
said plate is formed by means of exactly two plate segments, equally constructed, or equally large, plate segments, in such a manner that said two plate segments lie opposite one another to form mutually facing edges transitioning into said gap.

9. The sensor assembly as claimed in claim 8, wherein:
said two plate segments are connected together at least sectionally by material bonding, in such a manner that said two plate segments are welded, brazed or soldered together at the facing edges.

10. The sensor assembly as claimed in claim 1, wherein:
said deformation body and said sensor blade are adapted to be excited to execute, forced, oscillations about a shared static resting position and, in such case, to be moved relative to said protective apparatus, in such a manner that said sensor blade executes pendulum-like movements elastically deforming said deformation body.

11. The sensor assembly as claimed in claim 1, wherein:
said deformation body, said sensor blade and said protective apparatus are so dimensioned and arranged that, in the case of said sensor blade located together with said deformation body in a shared static resting position, these do not contact said plate of said protective apparatus.

12. The sensor assembly as claimed in claim 1, wherein:
said deformation body, said sensor blade and said protective apparatus are so dimensioned and arranged that said gap, in the case of said sensor blade located together with said deformation body in a shared static resting position, shows a minimum gap width, which is greater than 0.02 mm.

13. The sensor assembly as claimed in claim 1, wherein:
said deformation body, said sensor blade and said protective apparatus are so dimensioned and arranged that said maximum gap width of the gap is greater than 0.02 mm.

14. The sensor assembly as claimed in claim 1, wherein:
said plate of said protective apparatus is composed at least partially, predominantly or completely, of a metal; and/or
said deformation body and said plate of said protective apparatus are composed of the same material; and/or
said deformation body and said plate of said protective apparatus are components of one and the same, monolithic, formed part, cast or manufactured by 3D laser melting; and/or
said deformation body and said sensor blade are components of one and the same, monolithic, formed part, cast or manufactured by 3D laser melting.

15. The sensor assembly as claimed in claim 1, wherein:
said deformation body and said plate of said protective apparatus are connected together by material bonding; and/or
said deformation body and said sensor blade are connected together by material bonding.

16. The sensor assembly as claimed in claim 1, wherein:
said outer edge segment is adapted to be connected, by material bonding and/or hermetically sealedly, with a seat serving for mounting said deformation body on a wall of a tube or pipe, in such a manner that said deformation body covers an opening provided in the wall of the tube or pipe, hermetically seals it, and/or in such a manner that the first surface of said deformation body faces a lumen of the tube or pipe, such that said sensor blade protrudes inwardly into the lumen; and/or
at least one sealing surface, a surrounding and/or annular, sealing surface, is formed in said outer edge segment.

17. The sensor assembly as claimed in claim 1, wherein:
said deformation body is composed at least partially, predominantly or completely, of a metal, a stainless steel, or a nickel based alloy; and/or
said sensor blade is composed at least partially, predominantly or completely, of a metal, a stainless steel, or a nickel based alloy; and/or
said deformation body and said sensor blade are composed of the same material; and/or
said deformation body and said sensor blade are components of one and the same, monolithic, formed part, manufactured in a forming process, in the case of which a solid body with a geometrically defined form is produced from a formless material, or via a generative manufacturing method.

18. A sensor for registering pressure fluctuations in a flowing fluid, which sensor comprises:
a sensor assembly; as well as
a transducer element for generating a sensor signal representing movements of a sensor blade changing as a function of time, and/or representing deformations of said deformation body changing as a function of time;
said sensor assembly comprising:
a deformation body including a first surface, an oppositely lying, second surface and an outer edge segment;
said sensor blade, as well as;
a protective apparatus for protection of said deformation body from pressure surges exerted against said first surface and/or for protection of said deformation body from changes of temperature on said first surface, wherein:
said sensor blade extends from said first surface of said deformation body out to a distal end; and
said protective apparatus includes at least one plate adjoining said outer edge segment of said deformation body and extending radially inwardly in the direction of said sensor blade, in such a manner that:
between said plate and said deformation body a cavity is formed which accommodates a region of said sensor blade adjoining said first surface of said deformation body and remote from the distal end of said sensor blade, and
a gap formed between said plate and said sensor blade; and
wherein said deformation body, said sensor blade and said protective apparatus are so dimensioned and arranged that said gap, in the case of said sensor blade located together with said deformation body in a shared static resting position, shows a maximum gap width, which is less than 0.5 mm.

19. A measuring system for measuring at least one flow parameter changeable as a function of time of a fluid flowing in a pipeline, which measuring system comprises:
a sensor for registering pressure fluctuations in a flowing fluid, which sensor comprises: a sensor assembly for a sensor; as well as a transducer element for generating an electrical or optical sensor signal, representing movements of a sensor blade changing as a function of time and/or representing deformations of said deformation body changing as a function of time; as well as measuring electronics, which is adapted to receive and to process the sensor signal, to generate measured values representing that at least one flow parameter;

wherein said sensor assembly comprises:

a deformation body including a first surface, an oppositely lying, second surface and an outer edge segment;

said sensor blade, as well as;

a protective apparatus for protection of said deformation body from pressure surges exerted against said first surface and/or for protection of said deformation body from changes of temperature on said first surface, wherein:

said sensor blade extends from said first surface of said deformation body out to a distal end; and said protective apparatus includes at least one plate adjoining said edge outer segment of said deformation body and extending radially inwardly in the direction of said sensor blade, in such a manner that:

between said plate and said deformation body a cavity is formed which accommodates a region of said sensor blade adjoining said first surface of said deformation body and remote from the distal end of said sensor blade, and a gap formed between said plate and said sensor blade;

and wherein said deformation body, said sensor blade and said protective apparatus are so dimensioned and arranged that said gap, in the case of said sensor blade located together with said deformation body in a shared static resting position, shows a maximum gap width, which is less than 0.5 mm.

20. The measuring system as claimed in claim 19, further comprising:

a tube insertable into the course of the pipeline and having a lumen, which is adapted to guide the fluid flowing in the pipeline, wherein said sensor is inserted into the tube in such a manner that the first surface of said deformation body faces the lumen of the tube and said sensor blade protrudes inwardly into the lumen.

21. The measuring system as claimed in claim 20, wherein:

said sensor blade shows a length, measured as minimum distance between a proximal end of said sensor blade, which proximal end defines an end of said sensor blade bordering on said deformation body, to a distal end of said sensor blade, which distal end defines an end of said sensor blade remote from said deformation body, or its surface, wherein the length is less than 95% of a caliber (DN) of the tube and/or greater than half of the caliber (DN).

22. The measuring system as claimed in claim 19, further comprising:

a tube insertable into the course of the pipeline and exhibiting a lumen, which is adapted to guide the fluid flowing in the pipeline, wherein:

an opening is provided in the wall of the tube, said opening exhibiting a seat serving for mounting said deformation body on the wall, and said sensor is inserted into the opening in such a manner that said deformation body covers the opening, hermetically seals it, and the first surface of said deformation body faces the lumen of the tube, such that said sensor blade protrudes inwardly into the lumen.

23. The measuring system as claimed in claim 22, wherein:

said opening includes a seat serving for mounting said deformation body on the wall.

24. The measuring system as claimed in claim 23, wherein:

at least one sealing surface is formed in said seat.

25. The measuring system as claimed in claim 24, wherein:

at least one sealing surface is formed in said edge segment, and said sealing surface and said sealing surface of the seat are adapted for a hermetic sealing of the opening, also with at least one seal interposed.

26. The measuring system as claimed in claim 19, further comprising:

a bluff body arranged in the lumen of the tube and adapted to bring about a Kármán vortex street in the flowing fluid.

* * * * *